United States Patent
Doglione (10) Patent No.: US 6,442,483 B1
(45) Date of Patent: Aug. 27, 2002

(54) SYSTEM AND METHOD FOR DEFINING AND CREATING SURROGATE ADDRESSES FOR TOWNSHIP AND RANGE QUARTER SECTIONS

(76) Inventor: Arthur George Doglione, 2828 N. 74th Pl., Scottsdale, AZ (US) 85257-1506

( * ) Notice: Subject to any disclaimer, the term of this patent is extended or adjusted under 35 U.S.C. 154(b) by 0 days.

(21) Appl. No.: 09/682,336

(22) Filed: Aug. 21, 2001

(51) Int. Cl.$^7$ .............................................. G01C 21/00
(52) U.S. Cl. ........................... 701/300; 701/200; 702/5
(58) Field of Search ................................ 701/208, 200, 701/300; 702/5; 434/153

(56) References Cited

U.S. PATENT DOCUMENTS

| | | |
|---|---|---|
| 5,275,568 A | 1/1994 | Pfuetze |
| 5,362,239 A | 11/1994 | Pfuetze |
| 5,445,524 A | 8/1995 | Jones |
| 5,839,088 A | 11/1998 | Hancock et al. |
| 5,961,572 A | 10/1999 | Craport et al. |
| 6,006,160 A * | 12/1999 | Tamaki et al. ............... 340/995 |
| 6,047,236 A | 4/2000 | Hancock et al. |

OTHER PUBLICATIONS

Meneley, G. Joseph_Place coding: inventory analysis and recomendations—Iowa City: Institute of Urban and Regional Research, University of Iowa, Jul. 1976—pp. 1,2,6,9,10,14, 37 & 38.

* cited by examiner

Primary Examiner—Michael J. Zanelli (57) ABSTRACT

The present invention is a method and system for defining surrogate addresses that translate land descriptions used in the subdivision of public domain lands, including descriptions more recently extended into non-public domain areas, as set forth in the U.S. Public Land Survey System (PLSS), commonly known as the system of Townships and Ranges (T/R). This system of local coordinate (surrogate) addresses translates existing township and range quarter section declarations to a pair of positive integers, thereby eliminating cardinal point references while, substituting the lengthy legal descriptions of the existing (T/R) system, with a more versatile, useful, and more commonly understood grid coordinate identification system of location identifiers. The advantages of the system are numerous, including ease of visualization and ease of locating places on coordinated maps as well as, the enhanced capability relating to the automated processing of geospatial data.

8 Claims, 10 Drawing Sheets

Fig. 1b

Fig. 1a  Prior Art-Public Land Survey System (PLSS)

Fig. 1c

Fig. 2 Prior Art - Public Land Survey System (PLSS)

Principal Meridians

Black Hills Meridian, Boise Meridian, Chickasaw Meridian, Choctaw Meridian, Cimarron Meridian, Cooper River Meridian, Extended Fourth Principal Meridian, Fairbanks Meridian, Fifth Principal Meridian, First Principal Meridian, Fourth Principal Meridian, Gila and Salt River Meridian, Great Miami River, Humboldt Meridian, Huntsville Meridian, Indian Meridian, Kateel River Meridian, Louisiana Meridian, New Mexico Principal Meridian, Michigan Meridian, Mount Diablo Meridian, Muskingum River, Navajo Meridian, Ohio River, Principal Meridian, Ohio Company Purchase, St. Helena Meridian, St. Stephens Meridian, Salt Lake Meridian, San Bernardino Meridian, Second Principal Meridian, Seward Meridian, Scioto River, Sixth Principal Meridian, Tallahassee Meridian, Third Principal Meridian, Twelve Mile Square Reserve, Uintah Meridian, Umiat Meridian, Ute Meridian, Washington Meridian, Willamette Meridian, Wind River Meridian

Fig. 3.0

Reference Numerals in Drawings

| Number | Description |
|---|---|
| 100 | Principal Meridian |
| 120 | Base Line |
| 140 | Initial Point |
| 200 | Relocated Origin |
| 210 | Cells outside region boundaries |
| 220 | Y axis |
| 230 | X axis |
| 240 | Y axis values - latitude (AreaPlace North-South Address) |
| 250 | X axis values - departure (AreaPlace East-West Address) |
| 260 | Region |
| 261 | Townships (row or tier) |
| 262 | Township |
| 263 | Ranges (column) |
| 264 | Sections |
| 265 | Section |
| 266 | Quarter Section |
| 266a | Legal Description NE¼ Sec. 1, T1S R2W |
| 267 | Legal Description T3N R1W |
| 268 | Legal Description T1N R2E |
| 269 | Township |
| 269a | Legal Description T3N R2E |
| 300 | Rectangular Coordinate System (Township and Ranges) |
| 310 | Coordinate System |
| 320 | Quadrant I |
| 400 | AreaPlace™[6:30] |
| 410 | Implied Boundaries |
| 420 | Point-Intersection |
| 430 | Location - Quarter Section (AreaPlace™[3:60] |
| 440 | Imaginary grid lines |

Fig. 4.0

Table 2

| State | ID Code | Begin Y-axis | Begin X-axis | Max Y-axis | Max X-axis |
|---|---|---|---|---|---|
| Alabama | AL | 1 | 1000 | 687 | 1445 |
| Alaska | AK | 1 | 4000 | 3781 | 7665 |
| Arizona | AZ | 1 | 1000 | 748 | 1648 |
| Arkansas | AR | 1 | 1000 | 481 | 1560 |
| California | CA | 1 | 2000 | 1468 | 2957 |
| Colorado | CO | 1 | 1000 | 592 | 1797 |
| Connecticut | CT | 1 | 1000 | 194 | 1147 |
| Delaware | DE | 1 | 1000 | 193 | 1084 |
| District of | DC | 1 | 1000 | 55 | 1054 |
| Florida | FL | 1 | 1000 | 901 | 1984 |
| Georgia | GA | 1 | 1000 | 628 | 1549 |
| Hawaii | HI | 1 | 1000 | 1 | 1000 |
| Idaho | ID | 1 | 1000 | 886 | 1582 |
| Illinois | IL | 1 | 1000 | 775 | 1432 |
| Indiana | IN | 1 | 1000 | 553 | 1364 |
| Iowa | IA | 1 | 1000 | 437 | 1656 |
| Kansas | KS | 1 | 1000 | 427 | 1822 |
| Kentucky | KY | 1 | 1000 | 388 | 1837 |
| Louisiana | LA | 1 | 1000 | 556 | 1627 |
| Main | ME | 1 | 1000 | 629 | 1432 |
| Maryland | MD | 1 | 1000 | 259 | 1480 |
| Mssachuset | MA | 1 | 1000 | 212 | 1361 |
| Michigan | MI | 1 | 1000 | 799 | 1841 |
| Minnesota | MN | 1 | 1000 | 872 | 1623 |
| Mississippi | MS | 1 | 1000 | 671 | 1420 |
| Missouri | MO | 1 | 1000 | 655 | 1760 |
| Montana | MT | 1 | 1000 | 612 | 2066 |
| Nebraska | NE | 1 | 1000 | 433 | 1911 |
| Nevada | NV | 1 | 1000 | 976 | 1664 |
| New Hamp | NH | 1 | 1000 | 349 | 1198 |
| New Jersey | NJ | 1 | 1000 | 332 | 1177 |
| New Mexic | NM | 1 | 1000 | 741 | 1670 |
| New York | NY | 1 | 1000 | 484 | 1773 |
| N. Carolina | NC | 1 | 1000 | 387 | 1990 |
| N. Dakota | ND | 1 | 1000 | 424 | 1710 |
| Ohio | OH | 1 | 1000 | 514 | 1456 |
| Oklahoma | OK | 1 | 1000 | 480 | 1972 |
| Oregon | OR | 1 | 1000 | 675 | 1868 |
| Pennsylvan | PA | 1 | 1000 | 351 | 1638 |
| Rhode Islan | RI | 1 | 1000 | 112 | 1078 |
| S. Carolina | SC | 1 | 1000 | 461 | 1560 |
| S. Dakota | SD | 1 | 1000 | 478 | 1751 |
| Tennessee | TN | 1 | 1000 | 241 | 1960 |
| Texas | TX | 1 | 2000 | 1561 | 3723 |
| Utah | UT | 1 | 1000 | 721 | 1568 |
| Vemont | VT | 1 | 1000 | 307 | 1198 |
| Virginia | VA | 1 | 1000 | 408 | 1935 |
| Washington | WA | 1 | 1000 | 502 | 1776 |
| W. Virginia | WV | 1 | 1000 | 479 | 1531 |
| Wisconsin | WI | 1 | 1000 | 602 | 1581 |
| Wyoming | WY | 1 | 1000 | 556 | 1742 |

Fig. 5.0

Table 1

| Field Identifier | No. of Positions | Value Range/Max Value |
|---|---|---|
| Quarter Section Cardinal Points | 2 | 13, 14, 23, 24 |
| Section Number | 2 | 1...36 |
| Township Number | 2 | 1...99 |
| Township Cardinal Point | 1 | 1..4 |
| Range Number | 2 | 1...99 |
| Range Cardinal Point | 1 | 1..4 |

Table 3

| Field Identifier | No. of Positions | Value Range/Max Value |
|---|---|---|
| Consolidates Quarter Section | 4 | $1.3 \times 10^9 < X < 2.5 \times 10^9$ |
| Y Coordinate | 2 | $0 < X < 3000$ |
| X Coordinate | 2 | $999 < X < 8000$ |

Fig. 6.0

Example 1

| Legal Description | Numeric Value | Y-axis | X-axis |
|---|---|---|---|
| SWQ Sec. 31, T1N R3W | 2431011034 | 289 | 1265 |
| NWQ Sec. 31, T1N R3W | 1431011034 | 290 | 1265 |
| SEQ Sec. 31, T1N R3W | 2331011034 | 289 | 1266 |
| NEQ Sec. 31, T1N R3W | 1331011034 | 290 | 1266 |
| SWQ Sec. 30, T1N R3W | 2430011034 | 291 | 1265 |
| NWQ Sec. 30, T1N R3W | 1430011034 | 292 | 1265 |
| NEQ Sec. 30, T1N R3W | 1330011034 | 290 | 1266 |
| SEQ Sec. 30, T1N R3W | 2330011034 | 291 | 1266 |
| SWQ Sec. 19, T1N R3W | 2419011034 | 293 | 1265 |
| NWQ Sec. 19, T1N R3W | 1419011034 | 294 | 1265 |
| SEQ Sec. 19, T1N R3W | 1319011034 | 294 | 1266 |
| SWQ Sec. 19, T1N R3W | 2319011034 | 293 | 1266 |

Example 2

| Maricopa County Superior Court - AZ | Maricopa County Superior Court - AZ |
|---|---|
| East Court Building - AZ[298:1327] 101 West Jefferson St. - Phoeix, AZ 85003 | Southwest Mesa Complex-Adult Court AZ[289:1356] 222 East Javelina Av - Mesa, AZ 85210 |
| Central Court Building - AZ[298:1327] 201 West Jefferson St - Phoenix, AZ 85003 | Durango Phoenix Complex-Juvnl Court AZ[295:1326] 3125 West Durango St - Phoenix, AZ 85009 |
| West Court Building - AZ[298:1328] 111 South Third St - Phoenix, AZ 85003 | Southeast Mesa Complex-Juvnl Court - AZ[298:1356] 1810 South Lewis St Mesa, AZ 85210 |
| Old Court House - AZ[298:1327] 125 West Washington St-Phoenix, AZ 85003 | |

Example 3

| Locality ID™ | Arizona - Census Tracts |
|---|---|
| AZ[277:1351] | 5231.03 |
| AZ[277:1352] | 5231.03 |
| AZ[277:1353] | 5231.04 |
| AZ[277:1354] | 5231.04 |
| AZ[278:1351] | 5231.03 |
| AZ[278:1352] | 5231.03 |
| AZ[278:1353] | 5231.04 |
| AZ[278:1354] | 5231.04 |
| AZ[279:1351] | 5230.06 |
| AZ[279:1352] | 5230.06 |
| AZ[279:1353] | 5230.02 |
| AZ[279:1354] | 5230.02 |
| AZ[280:1351] | 5230.06 |
| AZ[280:1352] | 5230.06 |
| AZ[280:1353] | 5230.02 |
| AZ[280:1354] | 5230.02 |

Fig. 7.0

Example 4

| Arizona - Census Tracts | Block | Locality ID™ |
|---|---|---|
| 2168.02 | 316 | AZ[317:1343] |
| 2168.02 | 317 | AZ[317:1343] |
| 2168.02 | 318 | AZ[317:1343] |
| 2168.02 | 319 | AZ[317:1343] |
| 2168.02 | 320 | AZ[317:1343] |
| 2168.02 | 301 | AZ[317:1344] |
| 2168.02 | 302 | AZ[317:1344] |
| 2168.02 | 303 | AZ[317:1344] |
| 2168.02 | 305 | AZ[317:1344] |
| 2168.02 | 218 | AZ[317:1345] |
| 2168.02 | 212 | AZ[317:1346] |
| 2168.02 | 217 | AZ[317:1346] |
| 2168.02 | 422 | AZ[318:1342] |
| 2168.02 | 423 | AZ[318:1342] |
| 2168.02 | 424 | AZ[318:1342] |
| 2168.02 | 425 | AZ[318:1342] |
| 2168.02 | 402 | AZ[318:1343] |
| 2168.02 | 403 | AZ[318:1343] |
| 2168.02 | 404 | AZ[318:1343] |
| 2168.02 | 405 | AZ[318:1343] |
| 2168.02 | 406 | AZ[318:1343] |
| 2168.02 | 407 | AZ[318:1343] |
| 2168.02 | 416 | AZ[318:1343] |
| 2168.02 | 417 | AZ[318:1343] |

Example 5

| Quadrangle | Locality ID™ | Geological Survey 7.5 Min.TopographicMap |
|---|---|---|
| Mesa, AZ | AZ[304:1363] | Salt River Bed - Salt River Pima-Mar. Indian Co |
| Tempe, AZ | AZ[300:1341] | Papago Buttes Military Reservation |
| Tempe, AZ | AZ[299:1342] | Gov. Hunt Tomb, and Bass Hatchery |
| Tempe, AZ | AZ[303:1341] | Arizona Country Club |
| Tempe, AZ | AZ[303:1329] | Phoenix Country Club |
| Buckhorn, AZ | AZ[299:1396] | Lost Dutchman State Park |
| Baldy Mt., AZ | AZ[354:1304] | Lake Pleasant Visitor Center |

Fig. 8.0

Example 6

| Assessor | Book | Map | Qtr. Sec. Twp. & Range | Locality ID™ |
|---|---|---|---|---|
| 13 | 128 | 1 | NWQ Sec. 29, T2N R4E | AZ[304:1339] |
| 13 | 128 | 2 | NWQ Sec. 29, T2N R4E | AZ[304:1339] |
| 13 | 128 | 3 | NWQ Sec. 29, T2N R4E | AZ[304:1339] |
| 13 | 128 | 4 | NWQ Sec. 29, T2N R4E | AZ[304:1339] |
| 13 | 128 | 9 | NEQ Sec. 29, T2N R4E | AZ[304:1340] |
| 13 | 128 | 10 | NEQ Sec. 29, T2N R4E | AZ[304:1340] |
| 13 | 128 | 12 | NEQ Sec. 29, T2N R4E | AZ[304:1340] |
| 13 | 128 | 13 | NEQ Sec. 29, T2N R4E | AZ[304:1340] |
| 13 | 128 | 14 | SWQ Sec. 29, T2N R4E | AZ[303:1339] |
| 13 | 128 | 15 | SWQ Sec. 29, T2N R4E | AZ[303:1339] |
| 13 | 128 | 16 | SWQ Sec. 29, T2N R4E | AZ[303:1339] |
| 13 | 128 | 18 | SWQ Sec. 29, T2N R4E | AZ[303:1339] |
| 13 | 128 | 23 | SEQ Sec. 29, T2N R4E | AZ[303:1340] |
| 13 | 128 | 24 | SEQ Sec. 29, T2N R4E | AZ[303:1340] |
| 13 | 128 | 25 | SEQ Sec. 29, T2N R4E | AZ[303:1340] |
| 13 | 128 | 28 | SEQ Sec. 29, T2N R4E | AZ[303:1340] |

SYSTEM AND METHOD FOR DEFINING AND CREATING SURROGATE ADDRESSES FOR TOWNSHIP AND RANGE QUARTER SECTIONS

BACKGROUND OF THE INVENTION

The field of this invention is geographic location referencing system.

A geographic location system has an addressing scheme that allows a point or place to be uniquely identified. An address may be in the form of a numeric, alpha, or numeric and alpha code, a name, or a combination of a name and a code. A place is a particular portion of space, in this case Earth, whether of definite or indefinite extent. There are several commonly known address referencing systems used today that identify a location as either a specific point or an area that has both breadth and width. These addressing schemes may be categorized as: 1) Geodetic based, 2) Earth feature based, 3) Politically based, and 4) Application based. Almost all schemes use some type of systematic method, which may not be orderly, to identify a location; be it navigation, surveying, map making, neighborhood planning and zoning, market analysis, mail delivery, or census taking.

The following geodetic based identification systems are in use around the world. One of the oldest systematic methods of location is based upon the geographic coordinate system (Polar coordinates), of latitude and longitude, which is the foundation of other global and local systems used to identify or locate points or places on Earth. The most common systems in use today are actually a projection of a curved surface onto a flat plane. The Universal Transverse Mercator Grid (UTM) has been, as its name implies, imposed on the Transverse Mercator Projection. Another grid system imposed on the areas represented by the Polar Stereographic Projection is called the Universal Polar Stereographic (UPS) Grid.

The U.S. Army Military Grid Reference System is designed for use with the UTM and UPS Grids. The USAF uses a system that operates in conjunction with any map that has latitude and longitude printed on it; known as the World Geographic Reference System. The dimensions and orientation of different types of grids vary, but three properties are common to all military and civilian grid systems: 1) they are true rectangular grids; 2) they are superimposed on the geographic projection; and 3) they permit linear and angular measurement. The major goal of these systems is to: 1) reduce the length of written coordinates by substituting, in some instances, single letters for several numbers, and 2) eliminate ambiguity so no two places on Earth would have the same identifier. To accomplish this, most grid systems establish a false origin and employ the principles of northing and easting. Although these systems are known to be reliable and precise, and effective for those skilled in their use, they are too complex for many common applications useful in today's society. Their principles can be transferred to everyday use, however.

Another grid system, the State Plane-Coordinate system provides individual states the opportunity of creating local grid systems to match the size and shape of each state while at the same time being tied to the World Geodetic system. This network of zones may support control points for surveying purposes, it doesn't however, appear to provide the ideal alignment needs required for adequately cataloging and identifying places.

A more recently designed grid system, used by amateur radio clubs, can be found in the Maidenhead Locator System. This system is also based on geodesy, which requires tables for degrees and minutes conversion to grid square addresses. The granularity of this system limits the types of applications that can be adapted to this addressing scheme.

Another type of geographic reference system, one that may be classified as application based, and commonly known as a reference frame, has been devised by mapmakers for use with maps. A reference frame is the grid system usually identified by letters and numbers displayed along the edges of a map to assist map users locate information and maintain proper orientation. Local maps for the continental United States, its cities, and states are available from map makers such as, Rand McNally, National Geographic, Thomas Brothers, Trimble Atlas, H. M. Gousha, etc., as well as Major Oil Companies where the reference frame (coordinate addresses) and scale is different for each. These maps usually include an index and guide marks to aid the map user locate the desired information. Although the reference frame is of general purpose, the guide marks consisting of letters and numbers, are usually different from one map to the next. Accordingly, the map users are required to consult the map index to acclimate themselves with each map. The specific coordinate addresses identified by the guide marks are usually unique to each map and can not be used to locate information on a map provided by a different map maker. Also, if the scale of the map is changed the reference frame guides (coordinate addresses), are no longer of any use, i.e. a new set of guides must be developed.

An exception to the above generalization can be found on several maps of Arizona produced by the Phoenix Mapping Service since 1974, the Salt River Project, and the cities of Phoenix and Scottsdale. The reference frame used on Phoenix Mapping Service maps considers the entire State of Arizona whereby the origin of the grid is positioned at the most northwesterly point of the state and propagates outward in a southerly and easterly direction. Letters of the alphabet are used along the y-axis, while numbers are used along the x-axis. Each grid represents, for the most part, a section of land approximately one mile square. The use of letters along the y-axis requires repeating the alphabet by expanding the number of letters used, such as A, B, C . . . , AA, AB, AC . . . , BA, BB, BC . . . , etc. until all grids have been assigned an address. Their system, while providing a unique address for each grid is limited because of the size of each grid (one mile square), but primarily, because of the use of letters as an axis address and the downward expansion from the origin of the grid. Likewise, moving down or south from the origin is not as intuitive as moving north.

The Salt River Project's map grid maintains the cardinal points where each one-mile section is numbered moving outward, in all directions, from the point of origin. Both the cities of Phoenix and Scottsdale have devised their own numbering schemes whereby each one-half mile area has an address consisting of a number assigned to each axis of a county level coordinate system. Neither of these systems provides the capability of identifying quarter section of land beyond their particular political subdivisions.

There are some address reference systems that are application or politically based, which are not implemented with a coordinate system. These include Zip (Zone Improvement Plan) Codes, Assessor map areas, and zoning districts. Also, service and tabulation areas such as, Census Tracts and Blocks, Enumeration districts, Congressional Districts (CDs) and other voting districts, A. C. Nielsen's Designated Market Areas (DMAs), Basic Trading Areas (BTAs) & Market Trading Areas by Rand McNally, and Metropolitan Statistical Areas (MSAs), too name a few. These systems although useful for their intended purpose, do not provide scaling, stability, order, transferability or simplicity. While some are more stable than others, all of the mentioned systems from Zip Codes to MSAs, are subject to boundary changes over time. None of these systems are based on a common geographical unit and, as such, impose insurmountable obstacles when translation of data from one reference system too another is desired.

Patents for Jones, U.S. Pat. No. 5,445,524, and Hancock, et al., U.S. Pat Nos. 6,047,236 & 5,839,088 are local referencing systems that do not have a constant stable perimeter boundary for each geographical area. Consequently, tabulations or tabulation comparisons with other geographical areas is generally difficult, if not impossible. Also, map referencing is blurred due to the arbitrariness of location addresses. Another problem with Hancock, is the level of complexity inherent in such a system, which may in fact, make it unavailable to major segments of our society. Pfuetze, U.S. Pat. Nos. 5,275,568 and 5,362,239 when used in accordance with its intended purpose, is a vast improvement over current reference frame systems currently in use today. However, the major difficulty is that it doesn't provide a fixed address for geographic places. Craport, et al., U.S. Pat. No. 5,961,572 depends entirely on the geodetic system and relies on other address referencing systems to carry out point identification.

Geographic locations are, for the most part, fixed in space, i.e., anchored on Earth, and should be capable of being identified with a permanent address. What changes over time are, assumptions as to the shape of the Earth, the earth's magnetic force, and also, the technology used to measure and locate points on Earth. However, local addresses are capable of being referenced from local control points that do not change over time. The Public Land Survey System (PLSS), commonly known as the Township and Range (T/R) system is a system that is based on local control points. It is a complex system that can only be used by individuals who fully understand the rules for the identification and subdivision of large tracts of platted land or those skilled in the art of surveying. In addition, the addressing scheme used is lengthy and cumbersome, and requires a complex string of characters to specify the precise location of various sized tracts of land. As such, both manual and automated (computerized) processing of this legal description is an arduous, if not impossible task, which limits the functionality of the current method of referencing geographic locations. However, unbeknownst to most individuals, the T/R is one of the most important geographic location reference systems used in the United States, today. The federal government established the system in 1785 and, in spite of some obvious limitations, it is still used extensively by governmental, and public and private entities. Property tax agencies, utility companies, surveyors, planning departments, highway departments, real estate organizations, title companies, and private citizens are some of the entities that rely heavily on the T/R system.

One feature that is generally not used to advantage in the T/R system is the almost uniform dimension of quarter sections of land which is a half-mile square. Although tax assessors, utility companies, cities, counties, and state agencies, as well as public and private entities have certainly capitalized on this feature, they have not done so on a cooperative basis, everyone seems to do their own thing. In support of this fact, on Apr. 11, 1994, at the recommendations of the National Performance Review, President Clinton signed Executive Order 12906 to set in motion an effort to develop a coordinated National Spatial Data Infrastructure (NSDI). The order is designed to foster greater cooperation in generating and sharing geospatial data between Federal, State, local and tribal governments, and the private sector. As defined in the President's order, an NSDI is the, technology, policies, standards, and human resources necessary to acquire, process, store, distribute, and improve utilization of geospatial data. The President assigned to the Federal Geographic Data Committee (FGDC) the task of bringing NSDI about. The National Performance Review's recommendation acknowledges or confirms the need for a system for sharing geospatial type information. The following list excerpted from the Committee's, January 1998 publication, is further support for the need for an integrated geospatial system.

Toward An NSDI Ideal 1) There is a common spatial data foundation organized according to widely accepted layers and scales (or resolution) that is available for the entire area of geographic coverage (parcel, neighborhood, city, county, state, nation, etc.) to which other geospatial data can be easily referenced. 2) The foundation data is readily accessible and available at no or little cost from user-friendly and seamless sources to meet public needs and encourage conformance with it by producers of other geospatial data. 3) Both foundation and other geospatial data, as required and specified cooperatively by data producers and users, is updated according to commonly accepted standards and measures of quality. 4) Thematic and tabular data are also available on terms not incompatible with the foundation data. 5) When cost-effective, geospatial data produced by one organization, political jurisdiction, or nation is compatible with similar data produced by other organizations, political jurisdictions or nations. 6) Geospatial data can be integrated with many other kinds or sets of data to produce information useful for decision-makers and the public, when appropriate. 7) Responsibility for generating, maintaining, and distributing the data is widely shared by different levels of government and the private sector. Governments take advantage of private-sector capabilities available at reasonable prices rather than maintaining dedicated capabilities. 8) The cost of generating, maintaining, and distributing such data are justified in terms of public benefits and/or private gains; overlap and duplication among participating organizations is avoided wherever possible.

The overall uniformity of the T/R system could be used to benefit the general public on an everyday basis. Quarter sections are 260-acre (½ mile square) places where, people go too work and play, from one end of a state to the other, day in and day out. The following questions are not intended to be all-inclusive but rather illustrative, of the more common questions that frequently need to be answered by individuals (many of these questions and statements can be rephrased using the word place or locality for quarter section). 1) In which quarter section is a particular property situated? 2) Identify all properties located in a particular quarter section. 3) In which quarter section am I currently standing? 4) Where are the boundaries for a particular quarter section? 5) What is the area of a particular quarter section? 6) What are the physical features of a particular quarter section? 7) What utilities (gas, water, sewer, electric, communication lines, (telephone, cable, fiber optic, etc.) etc.) are available to a particular quarter section and where are they located? 8) What is the predominate use-classification of this particular quarter section? 9) Is this quarter section inhabited, if so, what is the population? 10) What is the frequency of incidence occurring in this particular quarter section? 11) Where is a particular quarter section situated? 12) What streets are situated in a particular quarter section? 13) In which quarter section(s) is this street situated? 14) In what part of the state, county, city, etc., is this quarter section situated?

Not all of the above questions would be relevant to each governmental unit, nor to every public or private entity. It is expected, that each entity will strive to satisfy their own particular needs by devising systems that are specific or adequate for their purpose. Seldom will these same systems solve another entities needs, however. The major emphasis here is, that all entities need the capability to communicate about a specific geographical area using a simple system of local coordinate addresses. Geographical areas, for the most part, remain fixed and should be capable of being identified using a simple, yet precise, address. Thus, what is needed is a referencing system that is concise, and intuitive, that can be used with a minimum amount of reading and searching, and at the same time assists in establishing permanent markers that can aid human spatial cognition.

Aside from some maps created by governmental agencies, the reference frame tick marks commonly found on consumer maps, are usually arbitrarily selected and seldom tied to permanent markers or control points set down on Earth. In reality, there should be a direct correlation between tick marks on a map and permanent address assigned to the specific geographical area. Further, a superior addressing scheme will enable both manual and automated processing of geospatial data by persons who are unskilled in the use of location referencing systems. In addition, a well-designed addressing method can support spatial cognition by assisting in location orientation and at the same time support the collection of geospatial data. Of the systems reviewed, only the PLSS posses the necessary elements for providing the foundation for a simple yet, robust geographic reference system.

SUMMARY OF INVENTION

The present invention relates generally to the codification of the coordinate system of Base Lines and Principal Meridians by developing and using a location referencing method to create proprietary addresses for the identification of locations associated with an established geographic information system, i.e., U.S. Public Land Survey System (PLSS). The invention is directed to a system and method for identifying a geographic area, within a geographic region using location addresses (locality identifiers), representing (x, y) coordinates in a rectangular grid. The location referencing method employs an orderly referencing scheme to assign local addresses that retain a known relationship with a regional and global referencing system. Said method may be equated to indexing or codification of known geographic locations. Accordingly, each location is identified by a set of coordinates that represent a particular quarter section of land in the PLSS.

Therefore, the object of this invention is to create a geographic location referencing system that will satisfy the following objectives. First, cardinal points are not to be part of the referencing address. Second, the same address must function as a tabulation identifier for the geographic location. And third, the addresses for adjacent locations must be capable of being determined intuitively, without the aid of maps.

A major feature of the PLSS, commonly known as the Township and Range (T/R) system is its geographical reliability to unambiguously identify the location of property within a region or state. A caveat for monuments that have been lost or destroyed as well as errors in surveys and legal descriptions is acknowledged. This invention relates specifically to a system and method that identifies the relative location of quarter sections as they relate to other quarter sections in a statewide grid system. Another feature of the T/R system is the grid structure that has provided for the orderly layout and expansion of a number of the cities in the western United State. Although the grid street pattern is common in many cities throughout the continental U.S., it seems only those cities where the T/R system is in place, show an unmistakable orderly framework of arterial streets running north and south, and east and west along quarter section lines. This is a feature that is used to advantage through the implementation of a local coordinated reference system of static geographic addresses.

According to the first, separate aspect of the present invention, there is provided a system and method for assigning unique location addresses to defined geographic places known as or would be known as quarter sections within the aforementioned (PLSS) rectangular survey system in the United States. In order to provide continuity, location address sequencing will continue, when feasible, for all U.S. states and, addresses will be assigned in instances where geographic areas have not been surveyed or surveying is incomplete.

According to the second aspect of the present invention, the aforesaid location addresses are known broadly as, Locality ID™(s) or individually as a Locality ID∩ (trademark term owned by inventor). The addresses identify geographic areas defined as quarter sections in the system of townships and ranges (T/R). Each Locality ID™ represents, for the most part, a common geographical unit. The advantage to using Locality ID™(s) is that they are tied to permanent control points (quarter section monuments), and are, 1) open ended, 2) unique, 3) orderly, 4) compact, 5) easy to recall, and 6) represent or identify, for the most part, orthogonal tracks of land (exceptions have been noted). In short, the Locality ID™ is designed to combine stability and simplicity with the use of a familiar reference frame.

According to the third aspect of the present invention, a separate and distinct grid is defined for each U.S. State representing each of the separate Principal Meridians and Base Lines, which is identified, by the two-character state abbreviation prefix to a pair of positive whole number coordinates.

According to the fourth aspect of the present invention, there is provided an alphanumeric geographic location-identification numbering system incorporating a character set having an alphabetical prefix, followed by a sequence of whole numbers wherein each whole number represents a coordinate in a particular grid identified by the alphabetic prefix.

According to the fifth aspect of the present invention, there is provided systems and methods for the conversion of quarter section, township and range descriptions to the herein-defined Locality ID™(s) and also to convert a particular Locality ID™ to its corresponding quarter section, township, and range description.

According to the sixth aspect of the present invention, there is provided a system of locator maps identifying the geographic areas of particular township and range quarter sections, identified with their corresponding Locality ID™.

According to the seventh aspect of the present invention, there is provided systems and methods for the parsing of street addresses for the purpose of identifying the precise geographic area identified by a particular Locality ID™ in which the particular property identified by its street address, is situated.

According to the eight aspect of the present invention, there is provided systems and methods for the identification of all street addresses located in a particular geographic area identified by a particular Locality ID™.

According to the ninth aspect of the present invention, there is provided systems and methods for the identification of the geographic area identified by a particular Locality ID™ in which a particular tax Assessor identified parcel is situated. And also to identify all tax Assessor identified parcels situated in a particular geographic area identified by a particular Locality ID™.

According to the tenth aspect of the present invention, there is provided systems and methods for the identification of the geographic area identified by a particular Locality ID™ in which particular Census Bureau, Census Blocks and Census Block Groups are situated. And also, to identify all Census Bureau, Census Blocks and Census Block Groups situated in a particular geographic area identified by a particular Locality ID™.

According to the eleventh aspect of the present invention, there is provided systems and methods to identify natural and manmade features, markers, monuments, landmarks, streets, and street intersections that form the perimeter of a particular geographic area identified by a particular Locality ID™.

According to the twelfth aspect of the present invention, there is provided systems and methods to identify the particular political entities in which a particular geographic area identified by a Locality ID™ is situated.

According to the thirteenth aspect of the present invention, there is provided systems and methods to identify the particular U.S. Department Of The Interior—Geological Survey Quadrangle Topographical Map Series, in which the particular geographic area identified by a particular Locality ID™ is situated.

According to the fourteenth aspect of the present invention, there is provided systems and methods to identify the particular geographic area identified by a particular Locality ID™ in which a point of interest (POI) is situated. The POI may, in fact, be a street or road, street address or a street intersection with city name and state, the name of a natural or manmade feature or landmark including business establishments, government facilities, and/or incidents/events of sorts (such as real estate transactions, crimes, etc.).

According to the fifteenth aspect of the present invention, there is provided systems and methods for acquiring longitude and latitude coordinates for the boundaries of each quarter section identified by a Locality ID™, which systems and methods may include the use of global position type systems (GPS).

While not designed to provide pinpoint accuracy (within a few meters), standard addresses identifying these places (quarter sections) can reduce or even eliminate the time spent searching maps and their indexes. The Locality ID™ (coordinate addresses) will aid cognitive thinking, by supporting a mental image, relating to where things are in space through the repeated use of a fixed frame of reference. It would also be the foundation for linking diverse types of information from a geographical perspective by answering the question of what; which could aid decision making by public and private entities, as wells as at all levels of government. Township surveys identify real places as defined by monuments that are fixed in the Earth. These monuments or markers are permanent control points that have stood the test of time for over 200 years and will continue to play an important role in modern day society.

Specifically, as outlined in this invention, the integration of diverse types of geospatial data would be more easily accomplished through the use of a simple local (state level) grid coordinate system, of published static identifiers for each quarter section of land. Those skilled in the art will recognize the advantages of having predefined (X, Y) coordinates to identify quarter sections of land that are easily identified by a Locality ID™. Further objects and advantages of my invention will become apparent from a consideration of the drawings and ensuing description.

BRIEF DESCRIPTION OF DRAWINGS

FIGS. 1a and 1b illustrate a region in relation to two distinct rectangular grid systems; the first grid FIG. 1a is contained within the boundaries of the region while FIG. 1b the second grid is situated outside the boundaries of the region.

FIG. 3.0 Principal Meridians.

FIG. 4.0 Reference Numerals in Drawings.

FIG. 5.0, Table 2.0, Beginning and max axis (coordinate) ranges for each State.

FIG. 6.0, Table 1.0, Data structure for creating a consolidated quarter section description. Table 3.0, Data structure for creating a database containing consolidated quarter sections with corresponding coordinate values.

FIG. 7.0, Example 1, shows a sample of quarter section legal descriptions with consolidated values along with x-axis and y-axis (coordinate) values. Example 2 shows how situs addresses can be enhanced through the addition of a Locality ID™. Example 3 displays a list of Locality ID™(s) and Census Tracts that have been cross-indexed.

FIG. 8.0, Example 4, shows how Locality ID™(s) and Census Blocks might be cross-indexed. Example 5, shows a sample of places from a Geological Survey Map and how these places might be located using a Locality ID™.

FIG. 9.0, Example 6 demonstrates how Assessor parcels might be cross-indexed with Locality ID™(s).

DETAILED DESCRIPTION

Figure 30:
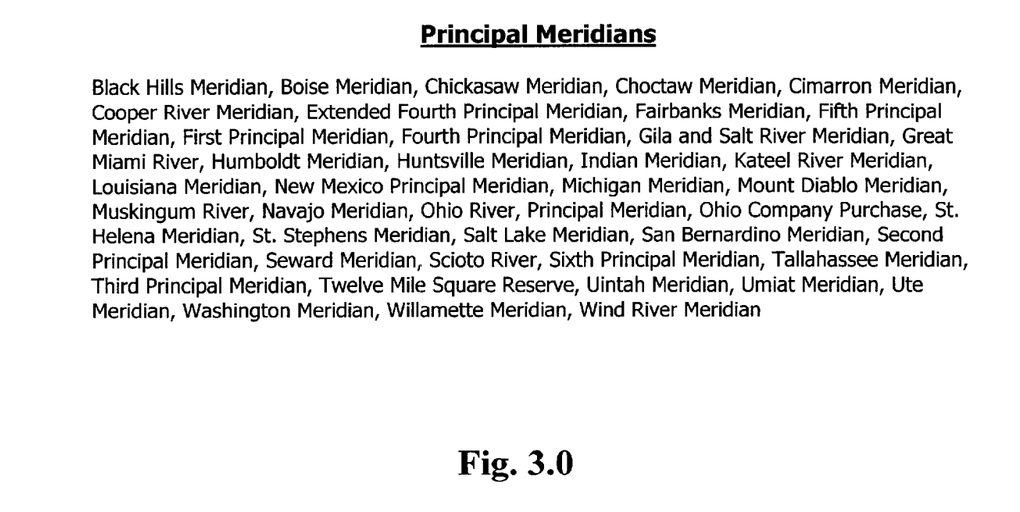
Figure 40:
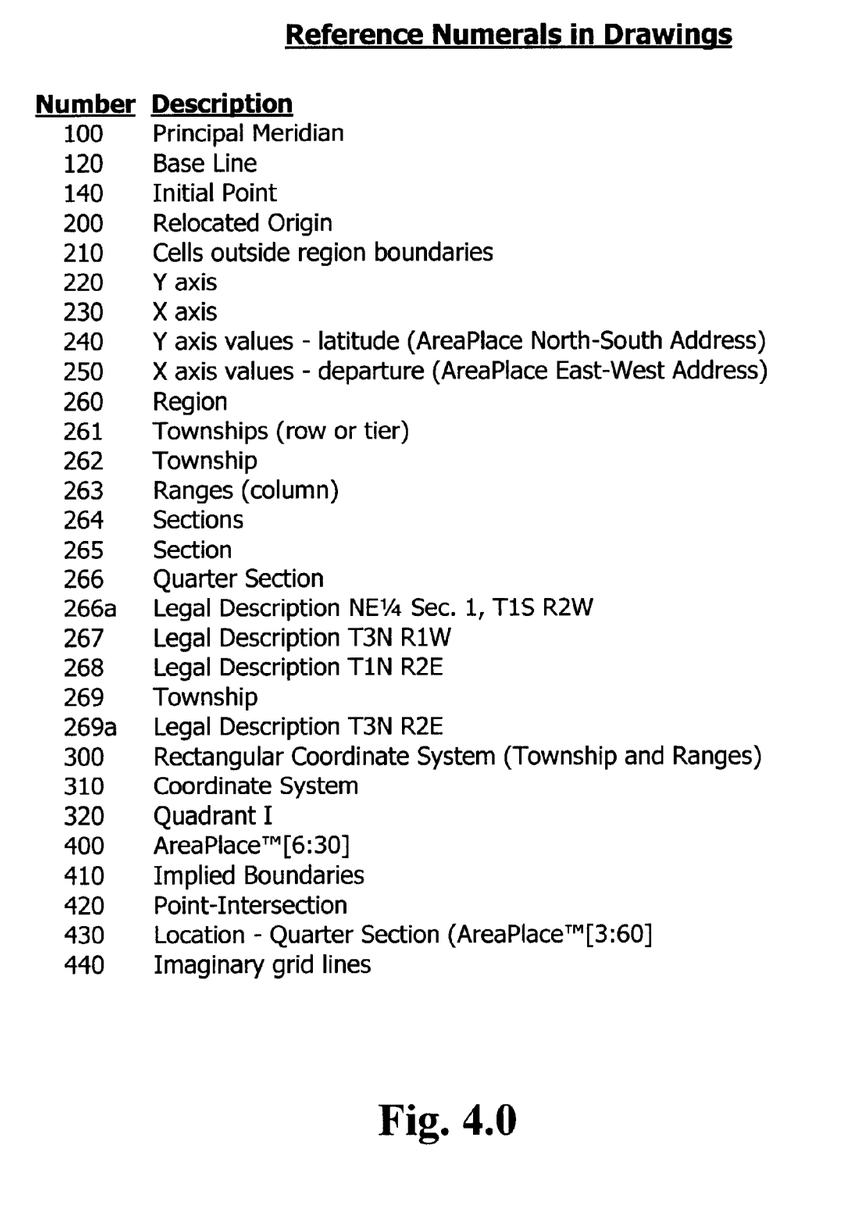

The present invention is directed to a system and method for identifying geographic areas commonly known as quarter sections of land, as defined by the Public Land Survey System (PLSS), using unique proprietary coordinate addresses. A typical township and range legal description will demonstrate the need for a more utilitarian identification system. Such an identification system will not replace the current PLSS but is complementary for the purpose of enabling a coordinate addressing system to function using surrogate identifiers. The following is a common T/R legal description: Southwest Quarter of Section 36, Township 1 North, Range 3 East. The abbreviated form for this description, SW ¼, Sec. 36, T.1 N., R. 3 E., is applicable to any of the Principal Meridians and Base Lines of record FIG. 3.0. It is fairly evident, the above legal description is cumbersome, and requires a complex string of characters to specify the precise location of a quarter section of land. As such, both manual and automated (computerized) processing of this description is an arduous, if not impossible task, which limits the functionality of the current method of referencing geographic locations. Translation from the current form of identification to a coordinate system involves a multi-step process, however. The first step requires the conceptual relocation of the grid north control point (establishing a false origin), so all cardinal point references can be eliminated. Step two provides for the conversion of legal descriptions to numeric values. Step three involves the assignment of coordinate value for each quarter section, and the final step provides for the creation of the translation database. Locator maps can be created at the conclusion of the translation process.

Source data for the identification of quarter sections will come from public and private records, field observations, and U.S.G.S. quadrangle maps, etc. Public Land Survey System Legal Descriptions are descriptions of areas of land that follow the pattern of Townships and Ranges established by the federal government in 1785. The descriptions have since been extended, following similar rules, to include non-public domain areas throughout the United States. The Origin of Public Land Survey System is a reference for the numbering of township and ranges within a public land survey area. These areas (regions) are known by the name of the principal meridian associated with the origin as listed in FIG. 3.0, which are dispersed throughout the United States.

Figure 1A:
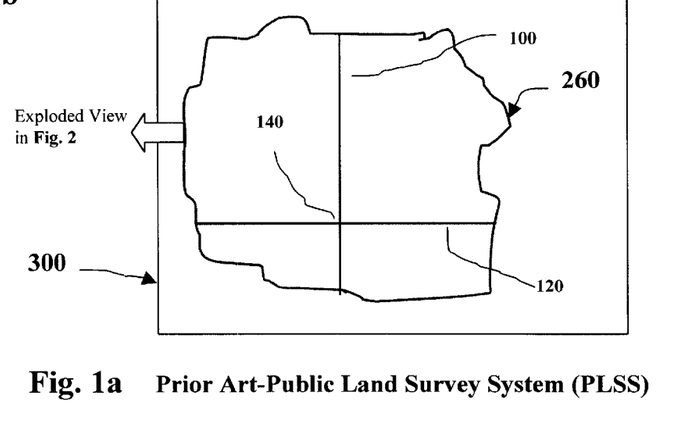
Figure 2:
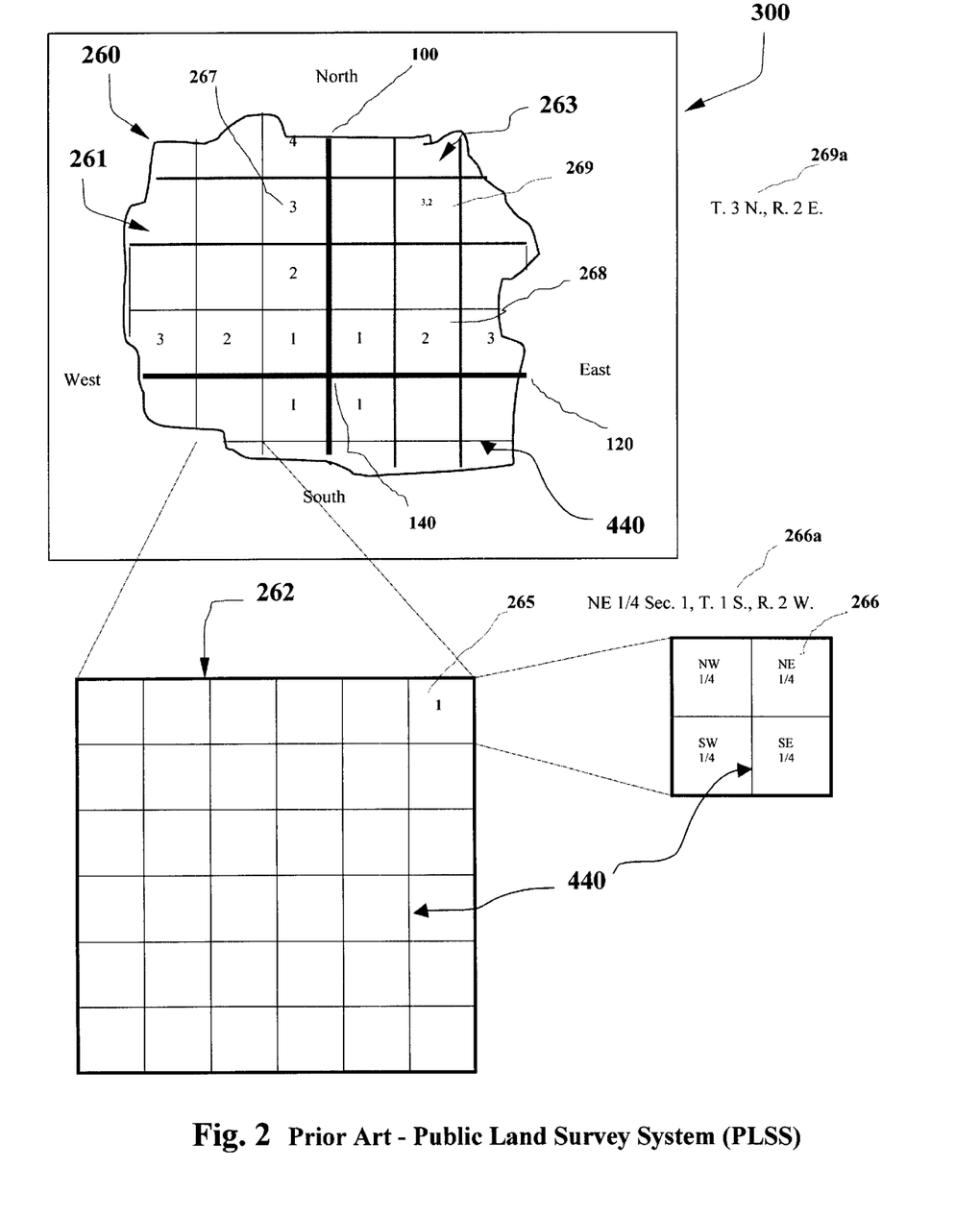
FIG. 2 is an exploded view of FIG. 1a showing the details and sub-areas of the Rectangular Survey System with a Principal Meridian and Base Line.

Referring to the drawings by numerals of reference; there is shown in FIG. 7a, a typical region 260 circumscribing a point 140 formed by the intersection of a Principal Meridian 100 and a Base Line 120. Next, a typical representation of the Public Land Survey System, FIG. 2 shows an exploded view of the region 260 depicting the typical layout of rows of townships 261 and columns of ranges 263 as they relate to the Principal Meridian 100 and Base Line 120. Accordingly, all four quadrants of the rectangular grid 300 are used to identify the location of tracts of land, Townships 262 propagating out in all directions from the origin 140 i. e., initial point. Each tract of land is identified by its cardinal points N, S, E, W and, its relative position to its Principal Meridian 100 and Base Line 120. The following two separate legal descriptions: T. 3 N., R. 1 W., 267 and T. 1 N., R. 2 E., 268 will demonstrate the awkwardness of the current system. The goal of this invention is to eliminate these required compass directions (cardinal points) from the identification of tracts of land while, maintaining an order showing the relationship of adjacent tracts of land.

Figure 1B:
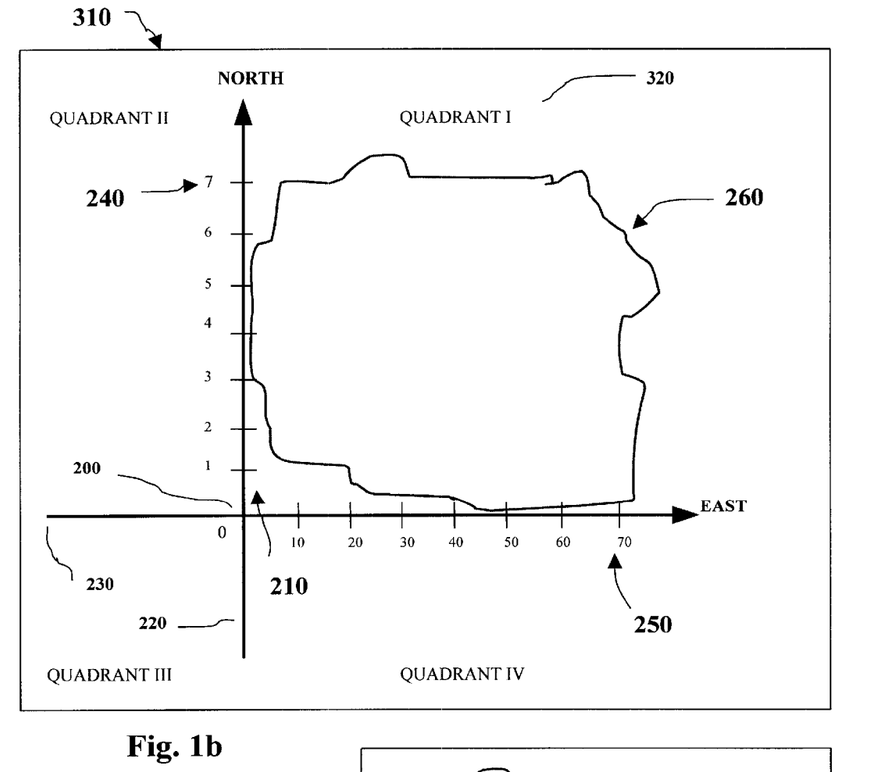

Step 7: FIGS. 1a and 1b are intended to show, in principle, a means to conceptually relocate the initial point for each Principal Meridian and Base Line, which may or may not reside within the boundaries of a particular region. Having first established orientation to grid north FIG. 1a for a region 260 using the Principal Meridian 100 and Base Line 120 for the selected region, a false origin FIG. 1b, 200 is subsequently established by conceptually relocating FIG. 1a the initial point 140 for the region. Said point being relocated to the most southwesterly location necessary for the particular region to fall within FIG. 1b the first quadrant 320 of the realigned coordinate system 370. The relocated origin 200 that is established by this invention for each region 260 is designed to maintain grid north and will guarantee that all geographic location address values will be positive. Repositioning of the origin 200 in this manner however, will create a rectangular grid (Cartesian coordinate system) containing cells wherein some cells will fall outside the boundaries 270 of the subject region 260. The present invention notes these exceptions to prevent erroneous references. In addition, the present invention is not a replacement or alternative surveying system. It is a system providing an alternative means for referencing quarter sections FIG. 2, 266 NE ¼ Sec. 1, T. 1 S., R. 2 W. 266a of land as defined and identified by the existing Public Land Survey System 300.

It is well known by individuals skilled in the art of surveying, that FIG. 1b the first or northeast quadrant 320 of the coordinate system 370 is used to measure latitude and departure. In surveying, coordinate locations are given by two values, the first being latitude 240 measured along the y axis 220, i.e., distance north from the origin 200 and the second being departure 250 measured along the x axis 230, i.e., distance east from the origin 200. An important point of discussion here relates to the declaration of (x, y) coordinates 250, 240 as used in cartography and mathematics as opposed to surveying. Typically, coordinates are stated as matched pairs (x, y) 250, 240 around the origin 200 representing the two axis of the coordinate system 370. The x value 250 identifies the distance from the origin 200 along the horizontal axis 230 with the y value 240 identifying the distance from the origin 200 along the vertical axis 220. It should be noted, the configuration of the Cartesian coordinate system, comprising four quadrants 370, i.e., where x refers to the horizontal axis 230 and y refers to the vertical axis 220 is the standard used in all disciplines. The standard is the same for surveying. The distinction that must be made is the order or sequence in which FIG. 2—township and range 269 is declared in legal descriptions T. 3 N., R. 2 E., 269a. Township, running north to south in rows or tiers 267 along the y-axis (Principal Meridian 100) is cited first and range, running east to west in columns 263 along the x-axis (Base Line 120) is cited last. This is the same for surveying where points are stated FIG. 1b as latitude and departure (y, x) 240, 250 as opposed to (x, y) 250, 240. As such, latitude, distance north is specified first and departure distance east is specified second.

Figure 1C:
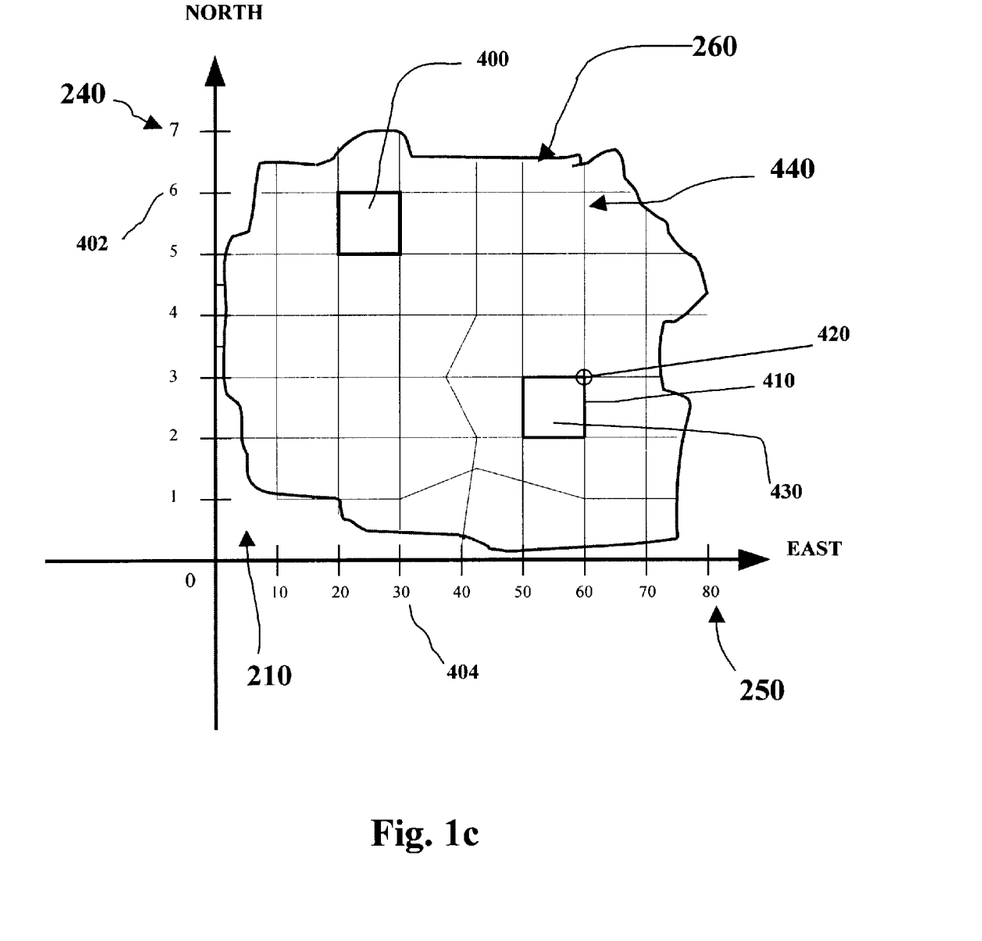
FIG. 1c illustrates a region superimposed on a grid that was synchronized with the Principal Meridian and Base Line for the region.

To maintain consistency with township and range declarations, the locational addresses are declared in the same manner and will be known as Locality ID™(s). FIG. 1c shows a typical Locality ID™: stateID[6:30] 400 where the north-to-south position [6] 402 is specified first and the east-to-west position [30] 404 is specified last. Although a minor aspect, it is important for this point to be understood, especially when the Locality ID™(s) will be used as the reference frame designations on locator maps for all geographic areas. The Locality ID™(s) FIG. 1c are coordinates that represent, in a single instance, implied boundaries 410 points 420 and locations 430. The point (.) (presumed monument), 420 being the presumed intersection of the quarter section boundary lines 410 and the location (quarter section) stateID[3:60] 430 is the geographic area to the southwest of the point and the enclosing lines with adjacent quarter sections. Imaginary grid lines 440, which connect monument after monument, identify the perimeters of quarter sections throughout the region.

Quarter sections are identified from available public and private documents and assigned coordinates represented by a pair of cardinal numbers greater than zero. Each location identifier assigned will represent a relation in a rectangular coordinate system. Cardinal numbers assigned to the X and Y coordinates for each state coordinate system will not overlap, i.e., rows (Y coordinates) synchronized with township quarter sections will always have values less than the values assigned to the columns or range quarter sections (X coordinates).

Figure 60:
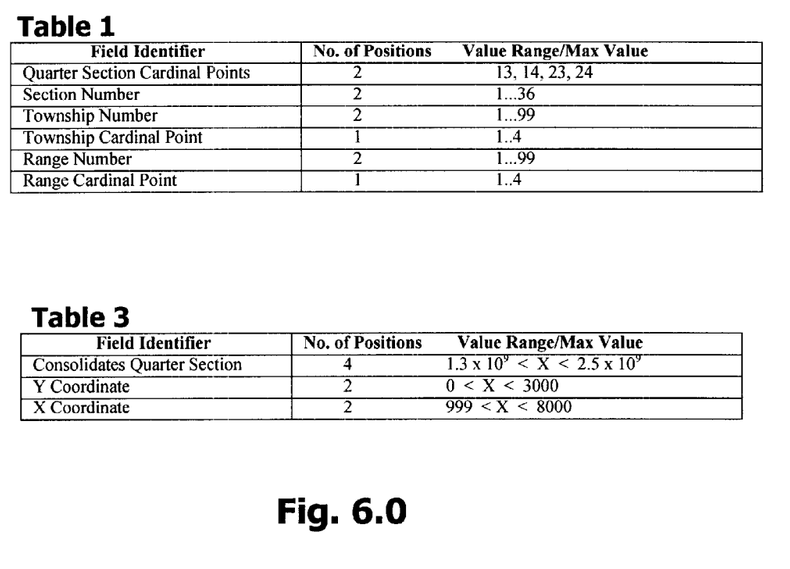

Step 2: provides for the conversion of each quarter section, township and range legal description to an all numeric identifier. This is accomplished by converting the cardinal points to numeric values as follows: N=1, S=2, E=3, and W=4. Partial sections, those not containing four quarters, will include a leading or trailing zero. Next, the data structure set forth in table 1.0, FIG. 6.0 is one possible alternative that can be used to create a consolidated quarter section description of the previously cited T/R description.

The legal description cited above, SW ¼, Sec. 36, T.1 N, R.3E. is converted to an unsigned integer (using 4 bytes or 32 bits), for automated processing, having a value less than 2,500,000,000, using the data structure in table 1.0 FIG. 6.0. Its numeric value is (converted to 24-36-01-1-03-3) 2,436, 011,033 as an unsigned integer, which represents a typical means of converting the cited legal description.

Step 3: involves the manual assignment of coordinate values in accordance with the establishment of the relocated origin representing a rectangular grid for the region as outlined above. Once the relocated origin for a region has been completed, the assignment of coordinate values can proceed in accordance with axis ranges from table 2.0, FIG. 5.0.

Step 4: the final step involves the creation of a database containing relevant information, such as the consolidated quarter section values and corresponding coordinate values as defined in table 3.0, FIG. 6.0 for each region. Ideally, the database will reside on a computer database but may initially evolve as a sequential cross reference list of corresponding values. Example 1 FIG. 7.0 presents the final results of the conversion process for a sample area in Arizona.

Having completed step 1, relocating the origin, step 2 was completed by converting each legal description to a numeric value as shown. Step 3 was completed by assigning coordinate values to each column and row, starting at the relocated origin, and moving north and east in accordance with table 2.0, FIG. 5.0 values for the State of Arizona.

There are five (5) basic rules for understanding the Locality ID™ addressing scheme: 1) Locality ID™(s) have two (2) parts: a.) State identifier, a two-letter prefix, identifies region, b.) Grid (y:x), coordinates enclosed in braces "[coordinates]" and separated by a colon (:). 2) y=north-south, coordinate (axis) values range between 1 & 999. 3) X=east west, coordinate (axis) values start at 1000. 4) Coordinate values increase to the north and east; decrease to the south and west. 5) Locality ID™(s) identify geographic areas approximately ½ mile square. A typical Locality ID™ for a location in Arizona is, AZ[302:1345]. See table 2.0, FIG. 5.0 for value range exceptions for Alaska, California, and Texas.

Within a given state, the first value of the matched pair (y, x) the vertical axis (y), will always be less than the value of the horizontal axis (x). This rule reduces the likelihood that individuals will transpose the coordinates when attempting to locate a place using an Locality ID™ Locator map of an area. When traveling in the field, assumptions can also be made relevant to direction, i.e.; coordinate values always increase moving north and decrease moving south. By the same token coordinate values always increase moving east and decrease moving west.

A notable aspect of the grid or matrix that is formed for each region; i.e., each state, centers around a grids physical characteristics, which is not typical of the vision one gets when thinking of a matrix. Grids are usually thought of as being symmetrical, having rigid and straight vertical and horizontal lines intersecting at 90-degree angles. The matrix formed as part of this invention is not at all conventional. The x and y axes will always intersect at 90 degrees. However, boundaries of individual quarter sections may not always intersect at a 90-degree angle. Accordingly, quarter sections, which in reality represent the cells of the grid, are not always true to form. There are instances where quarter sections are either larger or smaller than one half-mile square. Also, it can be expected that vertical or north-to-south boundaries on some quarter sections will not conform to grid north, nor will horizontal or east-to-west boundary lines always intersect at 90 degrees and be parallel to the horizontal axis. These variations which are part of the real world can cause the formation of highly irregular line segments and disjointed cells at various points throughout the grid FIG. 1c, 440.

An aspect that will be of benefit to travelers is the grid layout of arterial streets along quarter section lines as found in a number of major cities in the central and western United States. In these urban and close-in rural areas, the arterial street signs can be used as landmarks to identify the quarter sections, which are generally transparent to the residents and visitors alike. Other man-made or natural features can also identify boundary lines of quarter sections too assist individuals in orientating themselves. The single Locality ID™ will be used to identify a geographical area for location identification and mapping, and also, too support the tabulation of statistical information of the identified area. The present invention contemplates, but it is not limited to, the various embodiments disclosed herein.

Thus the reader will see that the local coordinate addresses known as Locality ID™(s) will assist visitors and residents alike locate places of interest with a minimal amount of effort. Individuals will be able to find the general location of points of interest regardless of where these places are situated within a given state. In time, narrative descriptions and profiles of these localities will assist in understanding the general make-up of these places of interest. Also, approximating the distance between two locations can be done with ease.

While my above description contains many specifications, these should not be construed as limitations on the scope of the invention, but rather as an exemplification of one preferred embodiment thereof. Many other variations are possible. For example a city directory may include Locality ID™(s) for every city facility. A franchise can include the Locality ID™ for each outlet. Telephone directories could include the Locality ID™ for Yellow Page listings. News Publications may include the Locality ID™ in articles and advertisements to help the reader understand where a subject is located, etc. Profiles of each Locality ID™ can assist individuals better understand the composition of an area, for example codes can be developed to reflect the major use of an area as commercial, industrial, residential, etc. Accordingly, the scope of the invention should be determined not by the embodiment(s) illustrated, but by the appended claims and their legal equivalents.

The examples set forth below describe various details of the various implementations of this invention. Cross indexed tables can be created to support these and additional uses as awareness to other applications becomes apparent. Example 1, FIG. 7.0 demonstrates the conversion of a series of Township and Range legal descriptions to numeric values and their corresponding Locality ID™(s). It shows how a database of numeric values with corresponding Locality ID™(s) enables the translation of Township and Range descriptions. Accordingly, multiple access points to Locality ID™(s) can be established through the use of similar cross indexed tables.

Example 2, FIG. 7.0 demonstrates how situs addresses can be enhanced through the addition of Locality ID™(s).

Residents and travelers alike will enjoy the ease of finding places when this additional information is used in conjunction with an Locality Locator map of the area. Using the Locality ID™(s), residents and travelers will be able to quickly and easily identify the general location of each of the court facilities as well as other points of interest using the Locality Locator map of the Phoenix Metropolitan area, which covers over 2100 square miles.

Example 3, FIG. 7.0 shows how Census data can be referenced using Locality ID™(s) that are cross-indexed to Census tracts. This example identifies four (4) adjacent census tracts and corresponding Locality ID™(s) in the City of Chandler, Ariz.

Figure 80:
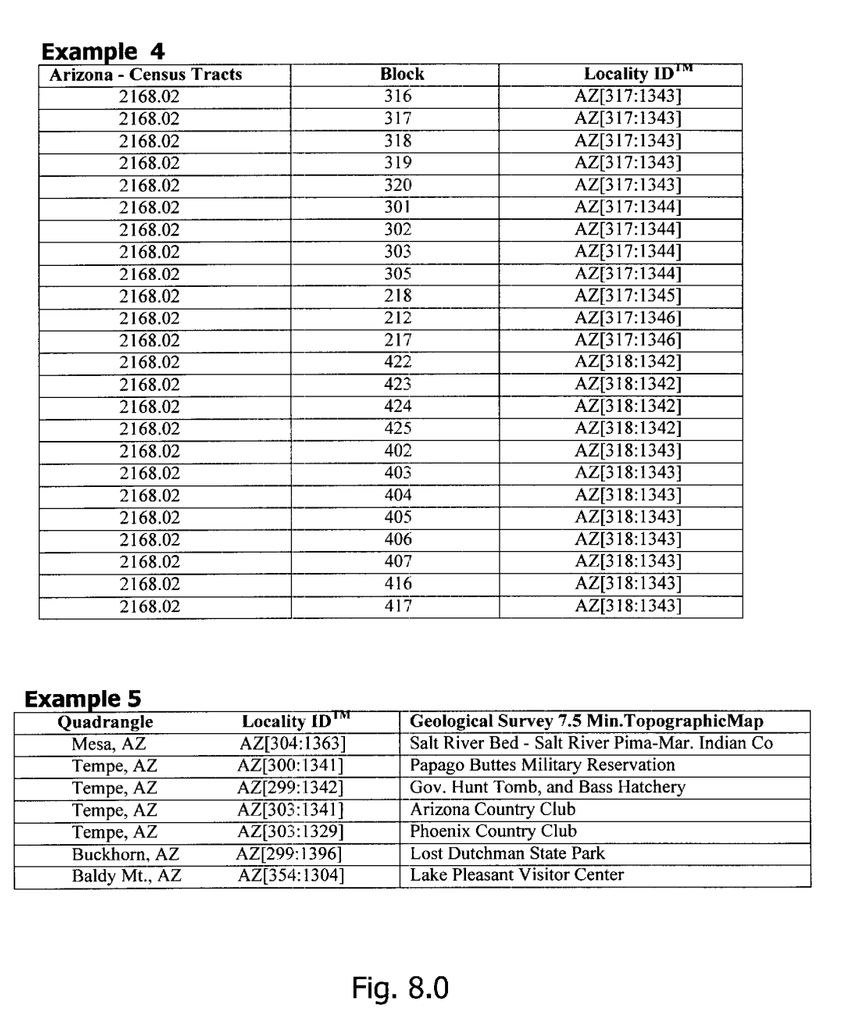

Example 4, FIG. 8.0 demonstrates how Census data at the block level can be indexed to Locality ID™(s). This example shows how Census data for the City of Scottsdale in the Phoenix, Ariz., SMSA can be indexed to support observation and analysis of statistical data without the user having to know anything about Census Tracts and Blocks.

Example 5, FIG. 8.0 shows how points of interest (POI) not having a situs address, can be found more easily using an Locality Locator map when the Locality ID™ is included with the name of the POI. This example includes sites from Geological Survey Topographic Quadrangle Maps.

Figure 90:
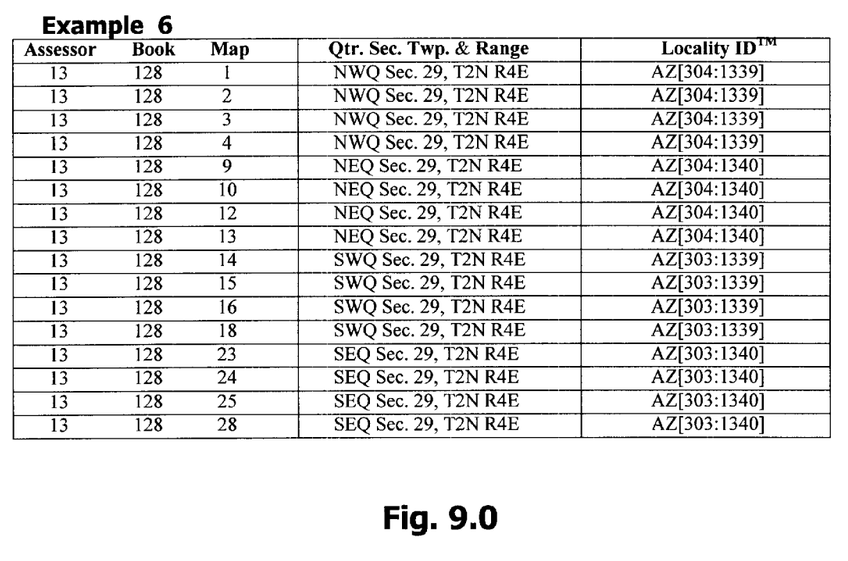

Example 6, FIG. 9.0 includes Assessor parcel data that has been cross-indexed to the Locality ID™(s) for the purpose of neighborhood analysis. The parcel numbers are from Maricopa County, AZ.

While embodiments and applications of this invention have been shown and described, it would be apparent to those in the field that many more modifications are possible without departing from the inventive concepts herein. The invention, therefore, is not to be restricted except in the spirit of the appended claims.

What I claim as my invention is:

1. A method for defining and using an improved geographic referencing system of surrogate addresses comprising the steps of:

selecting a known predefined region having a plurality of platted districts, each associated with a particular location having a known unique identifier associated with an initial reference point defined in terms of a well-known geographic grid referencing system;

converting each unique identifier for each district to a unique number by means of combining and replacing alpha characters of the unique identifier with numeric values while maintaining the same plurality of districts having predefined orientation and scale; and assigning to each of said districts a first unique district number in accordance to its relative position within the predefined region; and saving said unique converted district identifier, and also the assigned unique district numbers as an associated pair of coordinates wherein said coordinates consist of x axis values and y axis values such that the x axis values are not equal to the y axis values for the region; and incorporating said unique district numbers as coordinates on a map for geographic orientation of a region or part thereof wherein each set of coordinates identifies the tract of land or cell to the southwest of the intersecting point of said coordinates northerly and easterly boundaries.

2. The method of claim 1, further comprising the steps of:

repositioning, conceptually, said initial reference point by establishing a false origin to the southwest of said region; and creating a new grid in such manner so as to maintain orientation and scale of the plurality of said districts in accordance with the realigned reference point.

3. A map system in which a plurality of locations within a map for geographic orientation are uniquely defined by a pair of coordinates representing surrogate identifiers for quarter sections of land defined by the Public Land Survey System wherein each of said coordinates consists of vertical axis values that are less than horizontal axis values.

4. The map system according to claim 3 further including a first axis and a second axis at right angles to each other, said first axis positioned to be tangent to a first edge of said map, said second axis being positioned to be tangent to a second edge of said map.

5. The map system according to claim 4 wherein said first axis and said second axis may contain cells of irregular shapes and sizes wherein intersecting sides of said cells are not at right angles.

6. The map system according to claim 3 wherein an intersection of said first axis and said second axis is positioned in a lower left position relative to said map.

7. The map system according to claim 3 wherein said first axis and said second axis are marked in units greater than zero.

8. A method for defining and using an improved geographic referencing and mapping system of defined locations comprising the following steps:

selecting a known predefined region having a plurality of platted districts, each associated with a particular location having a unique identifier associated with an initial reference point defined in terms of a well-known land identification grid system; and relocating, conceptually, said initial reference point by, establishing a realigned grid system representing a false origin to the immediate southwest of said region; and converting each unique identifier for each district to a surrogate identifier represented as a pair of coordinates by means of substituting, combining, and replacing said unique district identifier and assigning to each of said districts a first unique district number in accordance to its relative position within the predefined region while maintaining the same plurality of districts having predefined scale and redefined orientation; and saving said pair of coordinates, and converted unique district identifier;

whereby quarter sections of land can be identified and referenced using surrogate identifiers consisting of coordinate addresses thereby, allowing a more coherent method of defining, referencing, and locating geographical areas for mapping and other related purposes.

* * * * *

UNITED STATES PATENT AND TRADEMARK OFFICE
CERTIFICATE OF CORRECTION

PATENT NO. : 6,442,483 B1
DATED : August 27, 2002
INVENTOR(S) : Arthur George Doglione It is certified that error appears in the above-identified patent and that said Letters Patent is hereby corrected as shown below:

Column 9,
Line 26, "FIG. 7a" change to -- FIG. 1a --
Line 45, "Step 7:" change to -- Step 1: --
Line 56, "system 370" change to -- system 310 --
Line 63, "aries 270" change to -- aries 210 --

Column 10,
Line 6, "system 370" change to -- system 310 --
Line 16, "system 370" change to -- system 310 --
Line 21, "quadrants 370" change to -- quadrants 310 --
Line 27, "tiers 267" change to -- tiers 261 --

Signed and Sealed this

Twenty-first Day of January, 2003

JAMES E. ROGAN
*Director of the United States Patent and Trademark Office*